United States Patent [19]

Martin

[11] Patent Number: 4,559,317

[45] Date of Patent: Dec. 17, 1985

[54] OLEFIN POLYMERIZATION

[75] Inventor: Joel L. Martin, Bartlesville, Okla.

[73] Assignee: Phillips Petroleum Company, Bartlesville, Okla.

[21] Appl. No.: 710,810

[22] Filed: Mar. 12, 1985

Related U.S. Application Data

[62] Division of Ser. No. 654,923, Sep. 27, 1984.

[51] Int. Cl.$^4$ ............................................. C08F 4/64
[52] U.S. Cl. .................................. 502/104; 502/119; 502/127; 502/128; 502/134
[58] Field of Search ............... 502/104, 119, 127, 128, 502/134

[56] References Cited

U.S. PATENT DOCUMENTS

| | | | |
|---|---|---|---|
| 3,644,318 | 2/1972 | Diedrich et al. | 260/88.2 |
| 3,951,935 | 4/1976 | Engelmann | 526/129 |
| 4,021,599 | 5/1977 | Kochhar | 526/124 |
| 4,136,058 | 1/1979 | Harris | 252/429 B |
| 4,238,354 | 12/1980 | Dietz | 252/429 |
| 4,240,929 | 12/1980 | Dietz | 252/429 |
| 4,347,162 | 8/1982 | Invernizzi et al. | 502/134 X |

Primary Examiner—Patrick P. Garvin
Attorney, Agent, or Firm—Howard D. Doescher

[57] ABSTRACT

A process for homo- and copolymerization of mono-1-olefins in the presence of a mixed catalyst comprising as component A the product of fluorinated magnesium alkoxide with tetravalent halogenated titanium compounds and as component B organoaluminum compounds which, optionally, contain an aromatic ester and/or an organoaluminum halide compound. The catalysts exhibit increased polymer productivity and less formation of soluble polymer.

19 Claims, No Drawings

OLEFIN POLYMERIZATION

This application is a division of application Ser. No. 654,923 filed Sept. 27, 1984, now pending.

BACKGROUND OF THE INVENTION

The present invention relates to a catalyst, a method for making the catalyst, and a polymerization process employing the catalyst. In accordance with another aspect, this invention relates to an improved olefin polmerization catalyst obtained by bringing together a catalyst component A formed by admixing a fluorine-containing magnesium alkoxide with a halogenated tetravalent titanium compound and an organoaluminum cocatalyst system designated a catalyst component B. In accordance with another aspect, catalyst component B comprises at least one of an organoaluminum compound and, optionally, an organoaluminum halide with or without an aromatic ester as part of the cocatalyst system. In accordance with a further aspect, an improved polymerization catalyst comprising a component A is produced by admixing at least one magnesium fluoroalkoxide with titanium tetrahalide, preferably in a diluent, and isolating the resulting product which product is combined with an organoaluminum cocatalyst system with or without an aromatic ester as part of the cocatalyst system, and employed for the polymerization of monoolefins such as ethylene and propylene.

In the field of catalytic polymerization of olefins, such as propylene, to produce useful solid polymers a continuing objective is to increase productivity. The activity of an olefin polymerization catalyst is one important factor in a continuous search for the ultimate catalyst to be used in an alpha-olefin polymerization reaction. The higher the activity and productivity of the alpha-olefin polymerization catalyst, assuming the properties and qualities of the polymer product remain the same, the greater the favorability and acceptability of the catalyst for use in alpha-olefin polymerization reactions. Although polymerization catalysts that are prepared by reacting a magnesium alkoxide with a titanium compound have been found to be acceptable, improvements can be made. The present invention relates to such an improvement whereby catalyst activity as well as the production of decreased amounts of soluble polymer are realized.

It is an object of this invention, therefore, to provide an improved process for the polymerization of olefins.

Another object of this invention is to provide improved catalysts for the polymerization of alpha-olefins.

Another object of this invention is to increase polymer production in an alpha-olefin polymerization process.

Still another object of this invention is to provide catalysts of increased activity for the polymerization of alpha-olefins.

A further object of this invention is to decrease the amount of soluble polymer production in an alpha-olefin polymerization process.

Other objects, aspects and the several advantages of this invention will become apparent to those skilled in the art upon the study of this disclosure and the appended claims.

SUMMARY OF THE INVENTION

In accordance with the invention, a process is provided for the preparation of solid olefin polymers by polymerization of at least one mone-1-olefin in the presence of a mixed catalyst comprising the product of a fluorine-containing magnesium alkoxide and a halogenated tetravalent titanium compound (component A) and an organoaluminum compound (component B).

Component A of the catalyst is the product formed by admixing at least one fluorine-containing magnesium alkoxide with a halogenated tetravalent titanium compound, preferably in an inert diluent such as a liquid hydrocarbon or a halocarbon compound, which product can be used as is or in combination with catalyst component B or subjected to isolation and recovery of solid titanium-containing component and then combined with at least one organoaluminum compound (component B).

It has been further found that the inclusion of an organoaluminum halide in the cocatalyst system (component B) results in additional improvements with respect to increased productivity and less formation of soluble polymer.

In accordance with another embodiment of the invention, catalyst component A is prepared in a diluent such as a liquid hydrocarbon or halocarbon compound which results in further reduction in formation of soluble polymer.

DETAILED DESCRIPTION OF THE INVENTION

A broad range of olefins can be polymerized in the presence of the catalyst system of the present invention. Commercial value can be visualized presently with alpha-olefins, which have from 2 to about 10 carbon atoms. The invention finds particular usefulness for the polymerization of at least one olefin of the formula $$R-CH=CH_2$$

wherein R represents an alkyl radical having from 1 to about 10 carbon atoms as well as for the copolymerization of at least one of these olefins with ethylene. Representative examples of suitable olefins that can be polymerized according to the invention include, ethylene, propylene, butene-1, pentene-1, 4-methylpentene-1, octene-1, decene-1, and the like, and mixtures thereof.

As indicated above, catalyst component A is formed by admixing a fluorine-containing magnesium alkoxide and a halogenated tetravalent titanium compound in the absence of or in the presence of a suitable diluent. Fluorinated magnesium alkoxides suitable according to the invention are those having from 1 to about 8 carbon atoms in the hydrocarbyl portion of the alkoxide and which contain from 1 to about 8 fluorine atoms in said hydrocarbyl portion.

The magnesium fluoroalkoxides if not available, can be prepared as follows from an alcohol and a dialkyl-magnesium.

$$2R^1OH + MgR_2 \rightarrow Mg(OR^1)_2 + 2R^2H$$

wherein $R^1$ is fluorine substituted alkyl and $R^2$ is alkyl with each $R^1$, $R^2$ containing from 1 to about 8 carbon atoms. Exemplary alcohols include trifluoromethanol; 2,2,2-trifluoroethanol; 1,2,2,2-tetrafluoroethanol; 1,1,1,3,3,3-hexafluoro-2-propanol; 2,2,3,4,4,4-hexafluoro-1-butanol; 2,2,3,3,4,4,5,5-octafluoro-1-pentanol; 1,1,2,2-tetrahydroperfluoro-1-octanol and the like, and mixtures thereof.

Any suitable tetravalent, halogenated titanim compound can be used as long as the titanium has one halogen attached thereto. Suitable compounds can be represented by the formula $TiX_a(OR^3)_{4-a}$ in which X stands for bromine, chlorine or iodine or mixtures thereof, a is an integer of 1 to 4, and $R^3$ is a hydrocarbyl group such as alkyl, cycloalkyl, or aryl groups and combinations thereof, such as alkaryl, containing from 1 to about 20 carbon atoms. Specific examples of suitable compounds include titanium tetrachloride, titanium dibromodichloride, titanium iodotrichloride, n-butoxytrichlorotitanium, chlorotridodecyloxytitanium, bromotricyclohexyloxytitanium, diphenoxydichlorotitanium, and the like, and mixtures thereof.

The most preferred tetravalent, halogenated titanium compounds are the titanium tetrahalides which include $TiBr_4$, $TiCl_4$, and mixtures thereof. Presently preferred is $TiCl_4$ because of ready availability and relatively low cost.

The fluorinated magnesium alkoxide which is in particulate form can be contacted with a solution comprising the titanium compound neat or in a diluent such as liquid hydrocarbon or halogenated compound.

The formation of catalyst component A can be carried out in a liquid medium which can be a hydrocarbon diluent inert in the process as for example, isobutane, n-heptane, cyclohexane, and the like, as well as a halogenated compound, e.g., $CCl_4$, $CH_2Cl_2$, $HSiCl_3$, and the like, for a period of time ranging from about one-half to about ten hours at a temperature ranging from about 80° to about 150° C. Suitably, if an alkane, such as n-heptane is used as diluent the reaction can be conducted by refluxing the mixture for about one hour. The reaction is conducted in the absence of water and oxygen which are excluded by operating with a dry gas purge, i.e., nitrogen, argon, etc.

The amount of titanium compound employed in contacting the magnesium compound can vary widely. Mole ratio of titanium compound to magnesium compound can vary from about 1:1 to about 100:1, preferably about 5:1 to about 50:1. In the preparation of catalyst component A in the absence of a second halogenated compound, titanium tetrahalide, for example, can be used neat or diluted with a liquid hydrocarbon such as n-heptane. However, when a titanium tetrahalide, such as titanium tetrachloride, is imployed with a second halogenated compound, e.g., $CCl_4$, $CH_2Cl_2$, $HSiCl_3$, a volume ratio ranging from about 1:10 to about 10:1 of titanium tetrahalide to second halogenated compound can be used. This corresponds to a weight ratio of titanium tetrahalide to second halogenated compound of about 0.13:1 to about 13:1 and a corresponding mole ratio of about 0.058:1 to about 9.2:1.

The amount of titanium in the invention catalysts ranges from about one-third to about one-half that of catalysts prepared in a similar manner from non-fluorine containing magnesium alkoxides. The difference is significant since substantially less titanium is present in the polymers as residue from the catalyst. As a result the polymers are less prone to discolor than the controls.

The magnesium fluoroalkoxide-titanium compound reaction product can be used as such and combined with cocatalyst component B or subjected to further treatment prior to combining with the cocatalyst. For example, the reaction product can be cooled, say to room temperature, the liquid decanted, and the slurry washed with several portions of a liquid hydrocarbon, such as a dry alkane, for example, and dried. The dried product is suitable for storage and/or combining with cocatalyst B for use in polymerization.

The three components, if a diluent is present, used to prepare catalyst component A can be mixed in any order. For example, any two components can be mixed prior to introduction of the third component. It is likewise within the scope of the invention to combine all three components simultaneously in a reaction zone.

The fluorine-containing magnesium-titanium catalyst component A described above can be combined with an organoaluminum compound cocatalyst component B to form an active catalyst effective for the polymerization of olefins.

The organoaluminum compound used in the catalyst formation can be a compound having the formula $$AlR^3{}_nX_{3-n}$$

wherein $R^3$ is a hydrocarbyl radical as described before containing 1 to about 20 carbon atoms, X is a hydrogen, halogen, preferably chlorine or bromine, or alkoxide having 1-20 carbon atoms, and n is a number of 1 to 3. Thus, suitable types of organoaluminum compounds are selected from trihydrocarbylaluminum, dihydrocarbylaluminum halide, hydrocarbylaluminum dihalide, dihydrocarbylaluminum hydride, dihydrocarbylaluminum alkoxide, hydrocarbylaluminum dialkoxide and the like, and mixtures thereof, e.g. hydrocarbylaluminum sesquihalide.

Examples of suitable specific organoaluminum compounds that can be used according to the invention include triethylaluminum, triisobutylaluminum, diethylaluminum hydride, diisobutylaluminum hydride, diethylaluminum chloride, diisobutylaluminum chloride, ethylaluminum sesquichloride, ethylaluminum dibromide, and the like, and mixtures thereof.

Generally, when ethylene is to be polymerized a single organoaluminum compound such as triethylaluminum or triisobutylaluminum is employed. When a branched chain mono-1-olefin, such as propylene is to be polymerized, the catalyst comprises a trihydrocarbylaluminum compound and preferably an aromatic ester, e.g., ethyl anisate, ethyl benzoate, methyl p-toluate, etc., and optionally an alkylaluminum halide compound to increase polymer yields and reduce soluble polymer production.

Particularly applicable compounds for improving stereospecificity are esters represented by the formula:

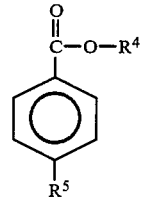

wherein $R^4$ represents alkyl groups having from 1 to about 4 carbon atoms and wherein $R^5$ represents monovalent radicals selected from the group consisting of —F, —Cl, —Br, —I, —OH, —$OR^4$, —$OOCR^4$, —SH, —$NH_2$, —$NR^4{}_2$, —$NO_2$, —CN, —CHO, —$COR^4$, —$COOR^4$, —$CONH_2$, —$CONR^4{}_2$, —$SO_2R^4$, —$CF_3$, —$NHCOR^4$, and hydrogen. Some examples of such compounds are ethyl benzoate, ethyl anisate(p-methoxybenzoate), ethyl p-dimethylaminobenzoate, ethyl p- fluorobenzoate, ethyl p-cyanobenzoate, methyl benzoate, isopropyl p-diethylaminobenzoate, butyl p-fluorobenzoate, n-propyl p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate and mixtures thereof.

The organoaluminum catalyst is used in amounts ranging from about 5 to about 2000 moles per mole of titanium and in a preferred range of about 25 to about 1500 moles per mole of titanium. The molar ratio of organoaluminum to aromatic ester can range from about 1:1 to about 8:1.

The catalyst components can be individually introduced into the polymerization reaction zone. The desired amounts can be added directly or flushed with portions of diluent as may be convenient. The catalyst components can be charged to the reactor individually, in any order, or they can be premixed, then charged to the reactor.

Polymerization can be carried out under conditions known in the art, such as in a liquid phase in the presence or absence of a diluent substantially inert under the reaction conditions employed, or reactions can be carried out in the vapor phase. It presently is preferred to polymerize propylene in liquid propylene in the absence of an inert diluent because separation of components is simplified and good results are obtained.

Ethylene presently is preferably polymerized in a diluent though other alpha-monoolefins conveniently need not be. Typical suitable diluents include n-butane, isobutane, pentane, n-hexane, n-heptane, n-octane, cyclohexane, and the like, or other saturated aliphatic hydrocarbons alone or in admixture.

The process for polymerizing olefins by use of a catalyst composition of the present invention can be carried out in a batch type, semi-continuous type, or continuous type reactor. Polymerization pressure can vary widely depending on the type of monomer, the catalytic activity of the catalyst system, the desired degree of polymerization, etc. Generally, the polymerization reaction can be carried out at a temperature in the range of about 0° to about 200° C., preferably a temperature of about 25° to about 100° C. Polymerization pressure can be subatmospheric or superatmospheric pressure up to about 300 atmospheres and preferably from atmospheric pressure to about 100 atmospheres.

Generally, when using a solvent or diluent in the instant polymerization reaction, it is convenient to introduce olefin into a dispersion containing the catalyst of the present invention in the solvent or diluent. The catalyst composition can be added in its whole amount to the polymerization system at the start of the polymerization or it can be added portion-wise over the period for the polymerization.

In order to carry out the present invention by a continuous or semi-continuous process, the contact between catalyst and monomer can be effected by various ways. For example, the olefin can be contacted with the catalyst in the form of a fixed bed, a slurry, a fluid bed, or a movable bed.

In order to recover a produced polymer from the polymerization system, the crude polymerization product is, for example, taken up and subjected to solvent extraction, hot filtration under a pressure or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

The following examples will serve to show the present invention in detail by way of illustration and not by way of limitation.

POLYMERIZATION PROCESSES

Several propylene polymerization runs were carried out in a 1 liter stirred stainless steel reactor for 1 hour at 70° C. maintained liquid full with propylene. The reactor was conditioned before each run by charging it with n-heptane and about 2 mmoles of triethylaluminum (TEA), heating it for about 1 hour at 110° C., then draining the contents, cooling the reactor to about 25° C. and purging it with nitrogen and then propylene vapor. In runs using TEA as the sole cocatalyst, the conditioned reactor was charged with 2.2 mmoles of TEA, about 5 mg (weighed) of dry catalyst, 10 psi (69 KPa) of hydrogen, measured as a pressure drop from a 250 cc vessel containing hydrogen and then liquid propylene until the reactor was about one-half full. The reactor was heated to 70° C. while filling it liquid full with propylene and the run was started. The reactor was maintained liquid full by supplying propylene as needed. After 1 hour, the volatile components were vented and the polymer was recovered, dried and weighed. The dry polymer was stabilized with a conventional stabilizing system, e.g., one comprising 2,6-di-t-butyl-4-methylphenol and dilauryl thiodipropionate, before ascertaining physical properties for characterization. Propylene solubles were not determined.

Additional propylene polymerization runs were carried out in a 1 gal (3.8 L) stirred stainless steel reactor for 1 hour at 70° C. under liquid full conditions. After conditioning the reactor as before a mixture of TEA and aromatic ester was charged followed by the catalyst, organoaluminum halide, if used, 20 psi (138 KPa) of hydrogen, measured as a pressure drop from a 360 cc vessel and 3 liters of propylene. As before the reactor was heated to 70° C. as it was filled liquid full with propylene and the run was started. As before, liquid full conditions were maintained during the run. After 1 hour, the run was terminated by injecting 5 cc of methanol to the reactor and cooling was started. Propylene was drained from the cooled reactor into a tared vessel. The solid polymer particles in the reactor were washed with 3 liters of propylene with the washings added to the tared vessel. The propylene was susequently evaporated and the amount of soluble polymer determined by weighing. The polymer in the reactor was recovered, dried and weighed. The dry polymer can be stabilized as before.

Ethylene/1-butene copolymerization runs were carried out in the 1 gal reactor at 80° C. for 1 hour. The conditioned reactor was charged with 0.5 mmole of TEA, catalyst, 25 psi (172 KPa) of hydrogen, measured as a pressure drop from a 2.4 L vessel and 2 L of isobutane as diluent. The reactor was heated to 80° C., ethylene and 1-butene, premixed, were added and the reactor pressure raised to about 315 psia (2.17 MPa) and held there during the run by adding ethylene on demand from a pressurized vessel. The run was terminated by venting volatile components. The solid polymer was recovered, dried, weighed and can be stabilized before determining its melt index, density or other properties.

EXAMPLE 1

Two catalyst were prepared, one a control catalyst from magnesium diethoxide, and the second, an invention catalyst from magnesium di(2,2,2-trifluoroethoxide) by contacting 1 g of the magnesium compound with a solution consisting of 5 cc of $TiCl_4$ and 15 cc of n-heptane for 2 hours at 130° C. Each catalyst was washed and dried as described before. Analyses disclosed that the control catalyst contained about 21 weight precent Ti and about 53 weight percent Cl whereas the invention catalyst contained about 9.5 weight percent Ti and 58 weight percent Cl.

A portion of each catalyst was tested in propylene polymerization at 70° C. in liquid propylene in the 1 L reactor with 2.2 mmoles of triethylaluminum TEA as cocatalyst and 10 psi hydrogen as earlier described.

Polymerization results with the control catalyst showed that its calculated productivity was 14 kg polypropylene per g solid catalyst per hour. This corresponds to about 67 kg polypropylene per g titanium per hour and to about 15 ppm titanium in the catalyst residue contained in the polymer. The polymer had a xylene solubles content of 40 weight percent as determined according to the procedure described in U.S. Pat. No. 4,243,552, column 8, line 66 to line 3, column 9, which is incorporated herein by reference. The melt flow of the polymer was 68 g/10 minutes as determined in accordance with ASTM D1238, condition L and its density was 0.8816 g/cc as determined according to ASTM D1505.

The calculated productivity of the invention catalyst was 34.7 kg polypropylene per g solid catalyst per hour. This corresponds to about 365 kg polypropylene per g titanium per hour and to about 2.7 ppm titanium in the catalyst residue contained in the polymer. The xylene soluble content of the polymer was determined to be 46 weight percent.

The results demonstrate the invention catalyst to be substantially more active than the control catalyst. As a result, thereof, the polymer contained much less titanium in the catalyst residue than the polymer produced with the control catalyst. However, both catalysts produced an unacceptable level of xylene soluble polymer when used in combination with TEA as the cocatalyst.

EXAMPLE 2

Two catalysts were prepared, one a control catalyst from a ball milled portion of magnesium di(2-propoxide) and the second, an invention magnesium fluoroalkoxide catalyst. The control catalyst was prepared by contacting 1 g of magnesium di(2-propoxide) with a solution consisting of 5 cc of $TiCl_4$ and 15 cc of $CCl_4$ at 115° C. for 2 hours, then isolating the product as before. The invention catalyst was prepared by contacting 12.7 mmoles (3.46 g) of magnesium di(hexafluoro-2-propoxide) with a solution consisting of 10 cc of $TiCl_4$ and 30 cc of $CCl_4$ at 115° C. for 2 hours, then isolating the product as before. Analyses disclosed that the control catalyst contained about 22 weight percent Ti and about 48 weight percent Cl and the invention catalyst contained about 8.2 weight percent Ti and about 62 weight percent Cl.

A portion of each catalyst was tested in propylene polymerization in liquid popylene in the 1 gal reactor at 70° C. with 25 psi hydrogen and 7.5 mmoles TEA plus 3.0 mmoles of ethyl benzoate (EB) as the cocatalyst system.

The control catalyst was determined to have a calculated productivity of 0.5 kg polypropylene per g solid catalyst per hour which corresponds to about 2.3 kg polypropylene per g titanium per hour and to about 430 ppm titanium in the catalyst residue contained in the polymer. The propylene soluble polymer level was determined to be 7.5 weight percent. The determination is made by draining the propylene from the reactor after the has been terminated, washing the polymer remaining behind in the reactor with liquid propylene, combining the liquid propylene fractions, flushing or evaporating off the propylene and weighing the solid residue.

In contrast, the calculated productivity of the invention catalyst was 4.4 kg polypropylene per g solid catalyst per hour which corresponds to about 53.6 kg polypropylene per g titanium per hour and to about 19 ppm titanium in the catalyst residue contained in the polymer. The propylene soluble polymer level was determined to be 4.9 weight percent. No other polymer properties were determined.

The polymerization results with the invention catalyst system, e.g., the catalyst plus the TEA/EB cocatalyst, showed it to be more active than the control catalyst system while at the same time it produced substantially less propylene soluble polymer. In addition, the calculated amount of titanium in the catalyst residue contained in the polymer was substantially lower than polymer produced with the control catalyst.

EXAMPLE 3

A portion of each catalyst prepared as described in Example 2 was employed in propylene, polymerization in liquid propylene in the 1 gal reactor at 70° C. with 25 psi hydrogen. However, in this example, a cocatalyst system consisting of 9.2 mmoles TEA, 4.6 mmoles EB and 9.2 mmoles of diethylaluminum chloride (DEAC) (2:1:2 mole ratio), was employed. In one run, with the invention catalyst, 4.6 mmoles of methyl p-toluate (MPT) was used in place of EB.

With the control catalyst, prepared from magnesium di(2-propoxide), a calculated productivity of 1.4 kg polypropylene per g solid catalyst per hour was obtained corresponding to about 6.4 kg polypropylene per g titanium per hour and to about 155 ppm titanium in the catalyst residue contained in the polymer. The propylene soluble polymer level was determined to be 6.5 weight percent. The addition of DEAC to the cocatalyst system resulted in the production of more crystalline polypropylene and less propylene soluble polymer when compared to the control catalyst results of the preceding example.

With the invention catalyst, prepared from magnesium di(hexafluoro-2-propoxide) and in the presence of a cocatalyst system consisting of TEA:EB:DEAC (2:1:2 mole ratio) a calculated productivity of 10.6 kg polypropylene per g solid catalyst per hour was obtained corresponding to about 129 kg polypropylene per g titanium per hour and to about 8 ppm titanium in the catalyst residue remaining in the polymer. The propylene soluble polymer level was determined to be 3.2 weight percent and the xylene soluble polymer was 5.8 weight percent. The polymer recovered from the reactor (not xylene extracted) was found to have a density of 0.9089 g/cc and a flexural modulus of 1310 MPa as determined in accordance with ASTM D 790.

With the invention catalyst and a cocatalyst system consisting of TEA:MPT:DEAC (2:1:2 mole ratio) a calculated productivity of 10.0 kg polypropylene per g solid catalyst per hour was obtained corresponding to about 122 kg polypropylene per g titanium per hour and to about 8 ppm titanium in the catalyst residue remaining in the polymer. The propylene soluble polymer level was 2.8 weight percent and the xylene soluble polymer was 4.6 weight percent. The polymer recovered from the reactor (not xylene extracted) was determined to have a density of 0.9098 g/cc, a flexural modulus of 1290 MPa and a melt flow of 2.1 g/10 minutes.

The results show the invention catalyst, with either cocatalyst system, to be substantially more active than the control catalyst while at the same time less propylene soluble polymer was produced. As before, the calculated amount of titanium in the catalyst residue contained in the polymer was much less than in polymer produced with the control catalyst.

The results also indicate that each aromatic ester behaves about the same in the cocatalyst system. The beneficial aspect of including DEAC in the cocatalyst system is evident based on increased productivity and lower propylene soluble polymer levels compared to the results obtained in the preceding example in the absence of DEAC.

EXAMPLE 4

Several invention catalysts were prepared from magnesium di(hexafluoro-2-propoxide). One catalyst was made by contacting 1 g of the magnesium compound for 2 hours at 100° C. with a solution consisting of 10 cc of $TiCl_4$ and 10 cc of $HSiCl_3$ and isolating the product as before. The second catalyst was made by contacting 1 g of the magnesium compound with a solution consisting of 10 cc of $TiCl_4$ and 10 cc of $CH_2Cl_2$ for 2 hours at 100° C. and isolating the product as before. The titanium in each catalyst was estimated to be about 8.2 weight percent based on the analysis obtained for the invention catalyst in Example 2 produced in a closely related fashion.

A portion of each catalyst was employed in propylene polymerization in liquid propylene in the 1 gal reactor at 70° C. with 25 psi hydrogen. Each catalyst was tested in the presence of a cocatalyst system consisting of 9.2 mmoles TEA, 4.6 mmoles EB and either 9.2 mmoles DEAC or 9.2 mmoles of ethylaluminum sesquichloride (EASC). The results obtained are presented in Table I.

third component, less xylene soluble polymer was produced. This is again reflected in the higher densities of specimens molded from the polymers absent xylene extraction.

Based on the estimated 8.2 weight percent titanium content of the catalyst, the calculated productivities obtained ranged from about 105 to about 140 kg polypropylene per g titanium per hour. The corresponding amounts of titanium in the catalyst residues contained in the polymer were calculated to range from about 7 to about 9 ppm.

EXAMPLE 5

A series of invention catalysts was prepared from magnesium di(trifluoroethoxide) and tested in ethylene/1-butene copolymerization. One catalyst was prepared by contacting 1 g of the magnesium compound for 2 hours at 130° C. with 20 cc (neat) of $TiCl_4$ and used in runs 1,2. The second catalyst was prepared by contacting 1 g of the magnesium compound for 2 hours at 100° C. with a solution consisting of 10 cc of $TiCl_4$ and 10 cc of $HSiCl_3$ and used in run 3. The third catalyst was prepared by contacting 1 g of the magnesium compound for 2 hours at 100° C. with a solution consisting of 10 cc of $TiCl_4$ and 10 cc of $CH_2Cl_2$ and used in run 4. The fourth catalyst, a control was made by contacting 1 g of previously ball milled magnesium diethoxide at 100° C. for 2 hours with a solution consisting of 10 cc of $TiCl_4$ and 10 cc of $CH_2Cl_2$ and used in run 5. Each catalyst was isolated as before.

The invention catalysts of runs 1-4 are estimated to contain about 9.5 weight percent titanium based on the analysis of the invention catalyst of Example 2 which was prepared in a closely related manner. Similarly, the control catalyst of run 5 is estimated to contain about 21 weight percent titanium based on the analysis of the control catalyst of Example 2 which was prepared in a closely related manner.

A portion of each catalyst was employed in ethylene/1-butene copolymerization at 80° C. in isobutane diluent in a 1 gal reactor in the presence of 0.5 mmole TEA as cocatalyst and 25 psi hydrogen as described earlier. The amount of 1-butene, premixed with ethylene, charged to the reactor and the results obtained are set forth in Table II.

TABLE I

Propylene Polymerization

| Run No. | Second Halogen Cpd. | Cocat. System | Calculated Productivity Kg/g/hr | Solubles Wt % Propylene | Solubles Wt % Xylene | Polymer Density g/cc | Polymer Melt Flow g/10 min. | Polymer Flex Mod. MPa |
|---|---|---|---|---|---|---|---|---|
| 1 | $HSiCl_3$ | TEA:EB:DEAC | 10.1 | 2.7 | 5.1 | 0.9058 | 6.1 | 1370 |
| 2 | $HSiCl_3$ | TEA:EB:EASC | 10.0 | 2.8 | 4.6 | 0.9098 | 2.1 | 1290 |
| 3 | $CH_2Cl_2$ | TEA:EB:DEAC | 11.5 | 2.1 | 4.0 | 0.9072 | 8.1 | 1420 |
| 4 | $CH_2Cl_2$ | TEA:EB:EASC | 8.8 | 1.6 | 3.6 | 0.9088 | 3.2 | 1460 |

Inspection of the data in Table I show that active catalysts were present in each run. The results in runs 3, 4 suggest that the catalyst made with a $TiCl_4$—$CH_2Cl_2$ mixture tended to produce somewhat less propylene and xylene soluble polymer than the catalyst of runs 1, 2 made with a $TiCl_4$—$HSiCl_3$ mixture regardless of the cocatalyst system used. This is reflected in the somewhat higher flexural modulus results for the polymers in runs 3, 4 compared to those in runs 1, 2. With either catalyst, the results also suggest that with a cocatalyst system containing EASC rather than DEAC as the

TABLE II

Ethylene1-Butene Polymerization at 80° C.

| Run No. | Second Halogen Cpd. | 1-Butene Added g | Calculated Productivity kg/g/hr | Polymer Properties Density, g/cc Bulk | Polymer Properties Density, g/cc Molded | Melt Index g/10 min |
|---|---|---|---|---|---|---|
| 1 | None | 100 | 55.4 | 0.28 | 0.9282 | 1.2 |
| 2 | None | 200 | 60.7 | 0.21 | 0.9127 | 3.1 |
| 3 | $HSiCl_3$ | 200 | 55.9 | 0.20 | 0.9114 | 2.2 |
| 4 | $CH_2Cl_2$ | 200 | 52.4 | 0.20 | 0.9116 | 2.6 |

TABLE II-continued

Ethylene/1-Butene Polymerization at 80° C.

| Run No. | Second Halogen Cpd. | 1-Butene Added g | Calculated Productivity kg/g/hr | Polymer Properties Density, g/cc Bulk | Polymer Properties Density, g/cc Molded | Melt Index g/10 min |
|---|---|---|---|---|---|---|
| 5 | CH$_2$Cl$_2$ | 200 | 102. | 0.24 | 0.9148 | 3.0 |

The results in Table II show the invention catalysts in runs 1–4 to be less active in ethylene/1-butene copolymerization than the control catalyst of run 5 under the conditions employed. However, in the presence of 200 g of added 1-butene, the invention catalysts in runs 2–4 appear to incorporate the comonomer more efficiently into the polymer structure than does the control catalyst of run 5 based on the lower molded densities obtained for the polymers. This difference is especially pronounced for polymers made with catalysts formed by contacting the magnesium compound with TiCl$_4$ *1 in admixture with either HSiCl$_3$ or CH$_2$Cl$_2$* as shown in runs 3,4. Based on the estimated titanium contents of the catalysts, the calculated productivities of the invention catalysts ranged from about 550 to about 640 kg polymer per g titanium per hour corresponding to about 1.6 to about 1.8 ppm titanium in the catalyst residue contained in the polymers. The calculated productivity of the control catalyst was about 485 kg polymer per g titanium per hour corresponding to about 2 ppm titanium in the catalyst residue contained in the polymer.

That which is claimed is:

1. A polymerization catalyst system comprising
   (1) a catalyst component A formed by admixing at least partially fluorinated magnesium alkoxide and a halogenated tetravalent titanium compound, and
   (2) a cocatalyst component B comprising an organoaluminum compound in a mole ratio of titanium compound to magnesium compound ranging from about 1:1 to about 100:1 and a mole ratio of organoaluminum to titanium ranging from about 5:1 to about 2000:1.

2. A composition according to claim 1 wherein component A is admixed in a second halogenated compound at a volume ratio of titanium to second halogenated compound ranging from about 1:10 to about 10:1.

3. A composition according to claim 1 wherein component A is admixed in a liquid hydrocarbon diluent.

4. A composition according to claim 1 wherein said alkoxide is magnesium di(2,2,2-trifluoroethoxide) or magnesium di(hexafluoro-2-propoxide) and said titanium compound is titanium tetrachloride.

5. A composition according to claim 4 wherein admixing takes place in a liquid halogenated compound.

6. A composition according to claim 4 prepared in a liquid hydrocarbon diluent.

7. A composition according to claim 1 which additionally contains an aromatic ester as part of cocatalyst component B, said aromatic ester being represented by the formula

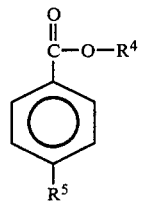

wherein R$^4$ represents alkyl groups having from 1 to about 4 carbon atoms and wherein R$^5$ represents monovalent radicals selected from the group consisting of —F, —Cl, —Br, —I, —OH, —OR$^4$, —OOCR$^4$, —SH, —NH$_2$, —NR$^4_2$, —NO$_2$, —CN, —CHO, —COR$^4$, —COOR$^4$, —CONH$_2$, —CONR$^4_2$, —SO$_2$R$^4$, CF$_3$, —NHCOR$^4$, and hydrogen.

8. A composition according to claim 1 wherein component B comprises a trihydrocarbylaluminum compound and an organoaluminum halide.

9. A composition according to claim 8 which additionally contains an aromatic ester as part of coatalyst component B, said aromatic ester being represented by the formula

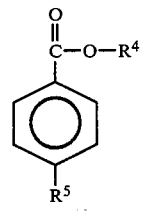

wherein R$^4$ represents alkyl groups having from 1 to about 4 carbon atoms and wherein R$^5$ represents monovalent radicals selected from the group consisting of —F, —Cl, —Br, —I, —OH, —OR$^4$, —OOCR$^4$, —SH, —NH$_2$, —NR$^4_2$, —NO$_2$, —CN, —CHO, —COR$^4$, —COOR$^4$, —CONH$_2$, —CONR$^4_2$, —SO$_2$R$^4$, CF$_3$, —NHCOR$^4$, and hydrogen, and said organoaluminum halide is selected from dialkylaluminum halides, alkylaluminum dihalides, and alkylaluminum sesquihalides.

10. A composition according to claim 4 wherein cocatalyst component B comprises a trihydrocarbylaluminum compound, an organoaluminum halide compound, and an aromatic ester, said aromatic ester being represented by the formula

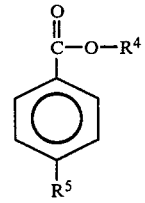

wherein R$^4$ represents alkyl groups having from 1 to about 4 carbon atoms and wherein R$^5$ represents monovalent radicals selected from the group consisting of —F, —Cl, —Br, —I, —OH, —OR$^4$, —OOCR$^4$, —SH, —NH$_2$, —NR$^4_2$, —NO$_2$, —CN, —CHO, —COR$^4$, —COOR$^4$, —CONH$_2$, —CONR$^4_2$, —SO$_2$R$^4$, CF$_3$, —NHCOR$^4$, and hydrogen.

11. A composition according to claim 10 wherein said trihydrocarbylaluminum compound is triethylaluminum, said organoaluminum halide compound is diethylaluminum chloride or ethylaluminum sesquichloride, and said ester is ethyl benzoate or methyl p-toluate.

12. A composition according to claim 11 wherein component A is formed in a liquid hydrocarbon diluent or a liquid halogenated compound.

13. A process for producing a catalyst for the polymerization of olefins comprising combining partially fluorinated magnesium alkoxide and halogenated tetravalent titanium compound under conditions to form a suspension containing the product of said alkoxide and said titanium compound, and reacting the product thus produced with an organoaluminum compound to form a polymerization catalyst system.

14. A process for forming a catalyst according to claim 13 in which the mole ratio of organoaluminum compound to titanium compound ranges from about 5:1 to about 2000:1 and the mole ratio of organoaluminum compound to magnesium compound ranges from about 1:1 to about 100:1.

15. A process according to claim 13 wherein the temperature conditions under which said partially fluorinated magnesium alkoxide and said halogenated tetravalent titanium compound are combined ranges from about 80° to about 150° C.

16. A process according to claim 13 wherein the suspension is filtered and the filter cake washed with liquid hydrocarbon to remove soluble components and dried prior to reaction with organoaluminum compound.

17. A process according to claim 16 wherein the catalyst system formed is further isolated by separating solids, washing of solids, and drying prior to subjecting to polymerization.

18. A composition according to claim 5 wherein said liquid halogenated compound is selected from $CCl_4$, $CH_2Cl_2$ and $H Si Cl_3$.

19. A composition according to claim 2 wherein said alkoxide is magnesium di(2,2,2'-trifluoroethoxide) or magnesium di(hexafluoro-2-propoxide), said titanium compound is titanium tetrachloride, and said component B is triethylaluminum.

* * * * *